United States Patent
Komeichi

(10) Patent No.: US 10,650,583 B2
(45) Date of Patent: May 12, 2020

(54) IMAGE PROCESSING DEVICE, IMAGE PROCESSING METHOD, AND IMAGE PROCESSING PROGRAM

(71) Applicant: TOPCON CORPORATION, Itabashi-ku, Tokyo (JP)

(72) Inventor: Takahiro Komeichi, Tokyo (JP)

(73) Assignee: TOPCON CORPORATION, Itabashi-ku, Tokyo (JP)

( * ) Notice: Subject to any disclaimer, the term of this patent is extended or adjusted under 35 U.S.C. 154(b) by 58 days.

(21) Appl. No.: 16/002,126

(22) Filed: Jun. 7, 2018

(65) Prior Publication Data

US 2018/0357778 A1    Dec. 13, 2018

(30) Foreign Application Priority Data

Jun. 9, 2017  (JP) .................... 2017-114098

(51) Int. Cl.
*G06T 17/05* (2011.01)
*G06T 5/50* (2006.01)
(Continued)

(52) U.S. Cl.
CPC ............. *G06T 17/05* (2013.01); *G01C 11/04* (2013.01); *G06T 5/50* (2013.01); *G06T 7/32* (2017.01);
(Continued)

(58) Field of Classification Search
None
See application file for complete search history.

(56) References Cited

U.S. PATENT DOCUMENTS 6,249,600 B1 *  6/2001  Reed ...................... G06T 17/00
                                              345/420
6,804,389 B1   10/2004  Ito et al.
(Continued)

FOREIGN PATENT DOCUMENTS

JP    4138145 B2    8/2008
JP    4237868 B2    3/2009
(Continued)

OTHER PUBLICATIONS

Nex, Francesco, and Fabio Rennondino. "UAV for 3D mapping applications: a review." Applied geomatics 6.1 (Mar. 2014): 1-15. (Year: 2014).*
(Continued)

*Primary Examiner* — Kim Y Vu
*Assistant Examiner* — Nathan J Bloom
(74) *Attorney, Agent, or Firm* — Chiesa Shahinian & Giantomasi PC

(57) ABSTRACT

Generation of an inappropriate image portion in an orthographic image due to occlusion is prevented. An image processing device includes an image data receiving part that receives image data of multiple photographed images taken by photographing an object from different positions, a coordinate designating part that receives designation of a specific position in the object, and an optimum-condition satisfying image selecting part that selects a photographed image that is taken from a direction in a specific range relative to the specific position, from among the multiple photographed images. The selected photographed image is used to obtain pixel information of the specific position.

3 Claims, 5 Drawing Sheets

(51) Int. Cl.
    *G01C 11/04*     (2006.01)
    *G06T 15/04*     (2011.01)
    *G06T 7/32*     (2017.01)
    *G06T 7/55*     (2017.01)
    *G06T 7/593*     (2017.01)

(52) U.S. Cl.
    CPC ............... *G06T 7/55* (2017.01); *G06T 7/593* (2017.01); *G06T 15/04* (2013.01); *G06T 2207/10028* (2013.01); *G06T 2207/10032* (2013.01); *G06T 2207/20221* (2013.01); *G06T 2207/30181* (2013.01)

(56) References Cited

U.S. PATENT DOCUMENTS

| | | | |
|---|---|---|---|
| 7,015,967 | B1 | 3/2006 | Kochi et al. |
| 9,171,402 | B1 | 10/2015 | Allen et al. |
| 2013/0236107 | A1 | 9/2013 | Fukaya et al. |
| 2015/0206023 | A1 | 7/2015 | Kochi et al. |
| 2016/0210500 | A1* | 7/2016 | Feng ............... G06T 19/20 |
| 2017/0277951 | A1* | 9/2017 | Wagner ............ G01S 7/4808 |

FOREIGN PATENT DOCUMENTS

| | | |
|---|---|---|
| JP | 4313462 B2 | 8/2009 |
| JP | 2013-178656 A | 9/2013 |
| JP | 2013-186816 A | 9/2013 |
| JP | 2014-035702 A | 2/2014 |

OTHER PUBLICATIONS

Extended Search Report dated Oct. 5, 2018, in connection with European Patent Application No. 18173774.3, 9 pgs.

Dorota Iwaszczuk, "Automatic Texturing of 3D Models of Urban Areas Using Image Sequences from Airborne TIR Cameras", Nov. 10, 2015, p. i, iii, 54-62, XP055509928.

Zhou et al., "Building facade texture extracted from high-resolution aerial photo", Visual Communications and Image Processing; Jan. 20, 2004-Jan. 20, 2004; vol. 9808, Dec. 9, 2015, pp. 98080F-98080F, XP060063000.

Wang et al., "Pictometry's proprietary airborne digital image system and its application in 3D city modeling", Int. Arch. Photogram. Remote Sens. 2008, vol. 37, Jan. 1, 2008, pp. 1065-1070, XP055509893.

Rau et al., "Analysis of Oblique Aerial Images for Land Cover and Point Cloud Classification in an Urban Environment", IEEE Transactions on Geoscience and Remote Sensing, vol. 53, No. 3, Mar. 1, 2015, pp. 1304-1319, XP011559208.

Computer Graphics, vol. 18, No. 3, Jul. 1984, p. 253-259.

http://www.gsi.go.jp/gazochosa/gazochosa40002.html; Homepage of Geospatial Authority of Japan, 12 pgs.

* cited by examiner

Fig. 6A
Fig. 6B
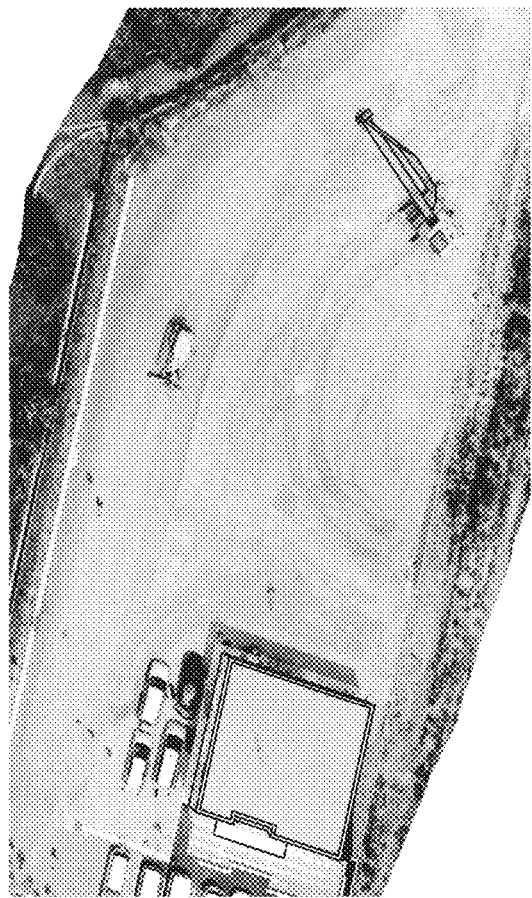
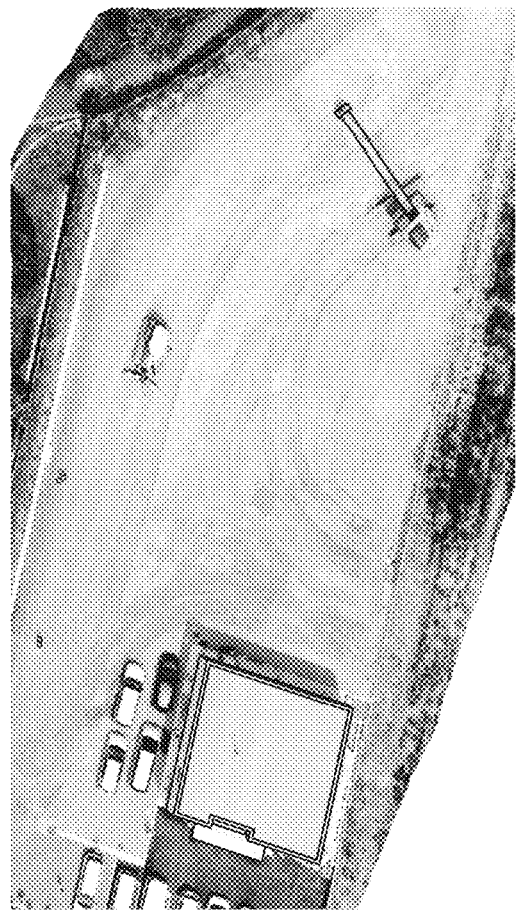

IMAGE PROCESSING DEVICE, IMAGE PROCESSING METHOD, AND IMAGE PROCESSING PROGRAM

CROSS-REFERENCE TO RELATED APPLICATION

This application is based upon and claims benefit of priority from Japanese Patent Application No. 2017-114098, filed Jun. 9, 2017, the entire contents of which are incorporated herein by reference.

TECHNICAL FIELD

The present invention relates to an image processing technique for photogrammetry.

BACKGROUND

Aerial photogrammetry may include an operation to generate an orthographic image on the basis of aerial photographs taken by a flying object. An example may be found at the homepage of the Geographical Survey Institute (URL: http://www.gsi.go.jp/gazochosa/gazochosa40002.html). Details of the orthographic image are disclosed in, for example, Japanese Patents Nos. 4138145, 4237868, and 4313462.

An orthographic image is generated on the basis of aerial photographs that are multiple aerial photographed images consecutively taken during a flight. The aerial photographed images are consecutively taken at photographic timings set so that the aerial photographed images taken in a consecutive manner or at very short time intervals will contain overlapping portions. Information of pixels constituting an orthographic image is mixed information of pixels acquired from the greatest possible number of the aerial photographed images. The mixed information of pixels is normally obtained by alpha blending. Multiple aerial photographed images are used in order to average the pixel information, compensate for missing image information, and correct imprecise image information.

Objects to be photographed by aerial photographing may include three-dimensional structures such as a cliff, a slope, a building, and a bridge. These objects tend to have parts that are hidden and thereby cannot be photographed, depending on point of view or photographing position. This generation of parts that cannot be photographed depending on point of view, is called "occlusion". For example, depending on the point of view, it may not be possible to photograph a part of a side surface of a building that is occluded.

The photographic images to be used for aerial photogrammetry are taken during a flight. Thus, multiple photographed images containing overlapping portions may include both a photographed image containing a specific portion that is occluded and a photographed image containing the specific portion that is not occluded. In such cases, in a process of generating an orthographic image, image information of the specific portion that is occluded in one photographed image and image information of the specific portion that is not occluded in another photographed image are mixed, and as a result, the specific portion eventually has unclear image information and has a condition different from its actual condition. This inconvenience can cause a problem in generating an orthographic image containing a three-dimensional object such as a cliff, a slope, a high-rise building, or a bridge.

SUMMARY OF THE EMBODIMENTS

In view of these circumstances, an object of the present invention is to provide a technique for preventing generation of an inappropriate image portion in an orthographic image due to occlusion.

A first aspect of the present invention provides an image processing device including an image data receiving part, a position designating part, and an image selecting part. The image data receiving part receives image data of multiple photographed images taken by photographing an object from different positions. The position designating part receives designation of a specific position in the object. The image selecting part selects a photographed image that is taken from a direction in a specific range relative to the specific position, from among the multiple photographed images. The selected photographed image is used to obtain pixel information of the specific position.

According to a second aspect of the present invention in the first aspect of the present invention, the image selecting part may select a photographed image taken at an angle of a threshold or less between a direction perpendicular to the specific position and a line connecting the specific position and a position of a camera at the time the camera takes the photographed image, from among the multiple photographed images. According to a third aspect of the present invention in the first aspect of the present invention, the image selecting part may select a photographed image taken at an angle of a threshold or less between a direction in the middle of a direction perpendicular to the specific position and a vertical direction and a line connecting the specific position and a position of a camera at the time the camera takes the photographed image, from among the multiple photographed images.

According to a fourth aspect of the present invention in any one of the first to the third aspects of the present invention, the image processing device may further include a point cloud data generating part that generates point cloud data of the object by using the multiple photographed images. The image selecting part may select a photographed image that does not contain the point cloud data at a distance of a threshold or less on the line connecting the specific position and the position of the camera at the time the camera takes the photographed image, from among the multiple photographed images.

A fifth aspect of the present invention provides an image processing method including receiving image data of multiple photographed images taken by photographing an object from different positions, receiving designation of a specific position in the object, and selecting a photographed image that is taken from a direction in a specific range relative to the specific position, from among the multiple photographed images. The selected photographed image is used to obtain pixel information of the specific position.

A sixth aspect of the present invention provides a non-transitory computer recording medium storing computer executable instructions for image processing that, when executed by a computer processor, cause the computer processor to: receive image data of multiple photographed images taken by photographing an object from different positions, receive designation of a specific position in the object, and select a photographed image that is taken from a direction in a specific range relative to the specific position, from among the multiple photographed images. The selected photographed image is used to obtain pixel information of the specific position.

The present invention is mainly directed to aerial photogrammetry but can be widely used in a technique of taking a photographed image for photogrammetry from a mobile body. For example, the present invention can be used in a case of using a photographed image taken from a vehicle traveling on the ground to perform photogrammetry.

The present invention prevents generation of an inappropriate image portion in an orthographic image due to occlusion.

BRIEF DESCRIPTION OF DRAWINGS

FIG. 6A is a view of an orthographic image generated without using the present invention, and FIG. 6B is a view of an orthographic image generated using the present invention.

DETAILED DESCRIPTION OF THE EMBODIMENTS

Configuration

Figure 1:
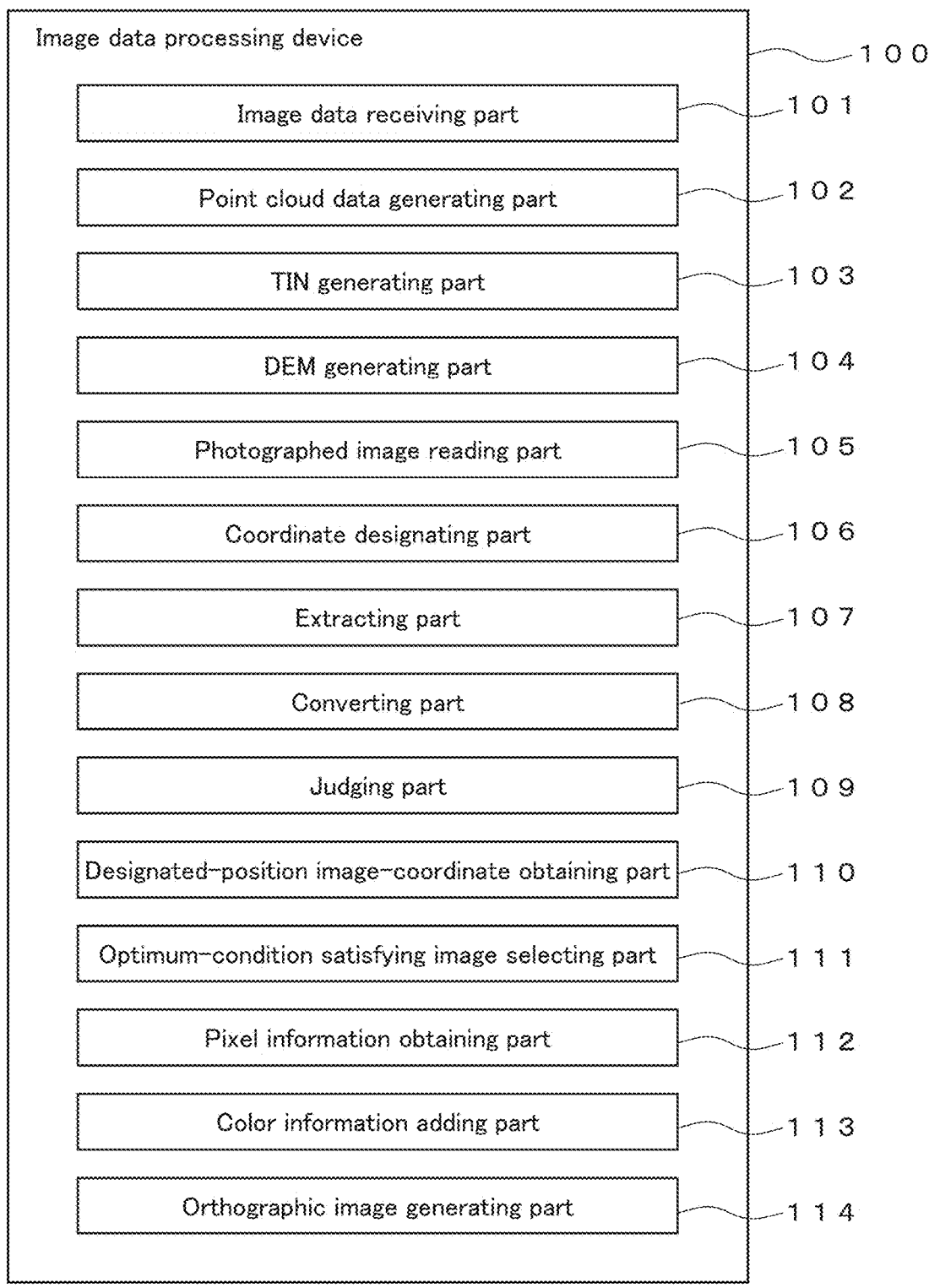
FIG. 1 is a block diagram of an image data processing device of an embodiment.

FIG. 1 illustrates a block diagram of an image data processing device 100 using the present invention. The image data processing device 100 functions as a computer and includes a CPU, a memory, other operation circuit, an interface circuit, and an interface function.

The image data processing device 100 is constructed of dedicated hardware, a commercially available personal computer (PC), a workstation, a data processing server, or other device. In one example, the image data processing device 100 may be constructed of a PC or a workstation that is equipped with a dedicated extension board for implementing some parts of the functions in FIG. 1. In another example, the configuration in FIG. 1 may be implemented as a system by constructing a computer having the functions in FIG. 1, such as a data processing server, connected with an operation terminal such as a smartphone or a tablet.

In a case of using a general purpose device such as a PC or a workstation, application software for executing the functions illustrated in the drawing is installed in this device and is operated to implement the image data processing device 100.

Some or all of the functional parts illustrated in FIG. 1 may be respectively constructed of dedicated operation circuits. A functional part constructed of software and a functional part composed of a dedicated operation circuit may be used together.

For example, each of the functional parts illustrated in the drawing may be constructed of an electronic circuit such as a central processing unit (CPU), an application specific integrated circuit (ASIC), or a programmable logic device (PLD) which is exemplified by a field programmable gate array (FPGA).

Whether each of the functional parts is to be constructed of dedicated hardware or is to be constructed of software so that programs are executed by a CPU is selected in consideration of necessary operating speed, cost, amount of electricity consumed, and other factors. Constructing the functional part by dedicated hardware and constructing the functional part by software differ from each other in the configuration, but are equivalent to each other from the viewpoint of obtaining a specific function.

The image data processing device 100 has an image data receiving part 101, a point cloud data generating part 102, a TIN generating part 103, a DEM generating part 104, a photographed image reading part 105, a coordinate designating part 106, and an extracting part 107 that extracts a photographed image likely to contain the position at the designated coordinates. The image data processing device 100 also has a converting part 108 that performs conversion into image coordinates, a judging part 109 that judges whether the designated coordinates are in an appropriate range in the read photographed image, a designated-position image-coordinate obtaining part 110, an optimum-condition satisfying image selecting part 111, a pixel information obtaining part 112, a color information adding part 113, and an orthographic image generating part 114.

The image data receiving part 101 receives image data of aerial photographed images taken from an aerial vehicle. The aerial vehicle may be a manned aerial vehicle or an unmanned aerial vehicle (UAV) (also called a "drone"). The aerial photographing is performed by using a camera that is arranged on the aerial vehicle so as to face the ground, normally, a vertical downward direction. The photographing is performed at a predetermined time interval, such as every 1 second or every 2 seconds. In some cases, a moving image may be photographed, and frame images constructing the moving image may be cut out to obtain aerial photographed images.

In a case of using a UAV as the aerial vehicle, the UAV is mounted with a camera for aerial photographing, an inertial measurement unit (IMU), a GNSS location identifying device, a storage for storing a flight plan and a flight log, a wireless communicating unit, a flight control unit, and an interface that transmits data such as the flight log to an external device. The UAV flies along a predetermined flight path and performs photographing of a region to be used in aerial photogrammetry, that is, a region of which an orthographic image is to be generated, during the flight. The photographing timing is set so that photographed images taken in a consecutive manner mostly contains overlapping portions and are slightly differentiated.

The flight log stored in the storage contains a photographing time, a photographing position represented by three-dimensional position coordinates, and an attitude of the UAV or a direction of the camera at the photographing time. The flight log data is collected after the flight is finished. The collected flight log data is sent to the image data processing device 100.

The image data receiving part 101 also receives data of a photographing time and a photographing position of a photographed image and an attitude of the UAV or an attitude of the camera at the photographing time, in addition to the data of the photographed image.

The point cloud data generating part 102 generates point cloud data of a photographed object on the basis of the image data received by the image data receiving part 101. In this embodiment, point cloud data is generated of a ground surface of which an orthographic image is to be generated. The ground surface is viewed from the air and includes a building and other objects.

The point cloud data represents an object in the form of a set of points and contains three-dimensional coordinates of each of the points. Calculation of point cloud data using image data can be performed by a technique disclosed in Japanese Unexamined Patent Application Laid-Open No. 2013-186816, for example. Point cloud data may be described in a map coordinate system. The map coordinate system describes coordinates in a map. For example, coordinate values of each point of point cloud data are described by latitude, longitude, and elevation.

Hereinafter, a method of calculating point cloud data is described briefly. First, two photographed images that contain the same object but are taken from different positions are selected. Point cloud data can also be generated by using three or more photographed images. However, for ease of explanation, a case of selecting two photographed images for a stereoscopic image is described herein.

After two photographed images for a stereoscopic image, that contain the same object but are taken from different points of view or different photographing positions, are obtained, feature points of the object are extracted from each of the photographed images. Then, a matching relationship of the feature points between the two photographed images is determined. The extraction of the feature points is performed by using a differential filter such as a Sobel filter, a Laplacian filter, a Prewitt filter, or a Roberts filter.

The matching relationship of the feature points between the two photographed images may be determined by a publicly known matching technique such as template matching. For example, the method disclosed in Japanese Unexamined Patent Application Laid-Open No. 2013-178656 may be used.

Moreover, exterior orientation parameters (position and attitude) of a camera at the time the camera takes each of the two photographed images, are calculated. Among several methods to calculate the exterior orientation parameters of the camera, a method of using positioning markers is adapted herein.

In this case, multiple positioning markers each of which location is identified by a surveying device such as a total station (TS) are arranged on a ground to be photographed. The positioning markers are arranged so that one photographed image will contain three or more positioning markers. On the basis of information of the locations of three or more positioning markers in one photographed image, exterior orientation parameters (position and attitude) at the time the camera takes the one photographed image, is calculated by a method of resection.

In this manner, the exterior orientation parameters at the time a camera takes each of a first photographed image and a second photographed image constituting a stereoscopic image, are calculated. After the exterior orientation parameters are calculated, three-dimensional coordinates of each feature point, of which the matching relationship between the first photographed image and the second photographed image is determined, are calculated by a method of intersection.

This work is performed on a pair of two aerial photographed images that are taken in a consecutive manner or at very short time intervals, whereby point cloud data of the photographed object is obtained. The above process for obtaining the point cloud data is performed by the point cloud data generating part 102.

The TIN generating part 103 generates a TIN by using the point cloud data generated by the point cloud data generating part 102. The TIN is a triangulated irregular network that three-dimensionally represents a modeled object in the form of a set of triangles. The TIN is also called an "irregular triangle network" or an "irregular triangular mesh". There are various types of methods and software for generating a TIN from the point cloud data, and a TIN is generated from point cloud data by using them. The technique of generating a TIN from point cloud data is disclosed in Japanese Unexamined Patent Application Laid-Open No. 2014-035702, for example.

The DEM generating part 104 generates a digital elevation model (DEM) on the basis of the TIN. The DEM is data containing a specified elevation value at a center point of a square consisting a grid that segments a ground surface in a grid. There are various types of methods and software for generating a DEM from a TIN, and a DEM is generated from a TIN by using them. In this case, an obtained DEM contains data of positions on a ground surface including a building in association with data of elevation at the ground surface.

The photographed image reading part 105 reads (acquires) aerial photographed images that are candidates for use in generating an orthographic image. Typically, several tens to several hundreds, or even more, aerial photographed images are read.

The coordinate designating part 106 serves as a position designating part that designates ground coordinates at a position in a region of which an orthographic image is to be generated. The designation of coordinates is performed on every pixel constituting an orthographic image, one by one. The units of the designated coordinates are, for example, latitude, longitude, and elevation. The designated coordinates herein are coordinates of a position of a ground surface, for example, a top surface or roof surface of a building, by using the DEM generated by the DEM generating part 104. The range of the designated position is selected in accordance with necessary resolution. As the range (area) of the designated position decreases, the resolution of final data increases, but the operation burden increases. In contrast, as the range (area) of the designated position increases, the operation burden decreases, but the resolution of obtained data decreases.

The extracting part 107 extracts a photographed image containing a point on the DEM corresponding to the designated position, from among the photographed images read by the photographed image reading part 105. This extracted photographed image is a photographed image that is likely to contain the position at the designated coordinates.

The photographed image extracted by the extracting part 107 may not contain the position at the designated coordinates. This occurs because the extraction of the photographed image is performed by the extracting part 107 by referring to point cloud data with uneven density or by referring to approximate points in some cases. Thus, there may be cases in which a position at the designated coordinates is occluded or is not contained in the photographed image extracted by the extracting part 107. From this point of view, the extracting part 107 extracts a "photographed image that is likely to contain a position at the designated coordinates".

The converting part 108 converts the coordinates designated by the coordinate designating part 106, which are coordinates at the designated position, into coordinates at a position in a screen of the aerial photographic image. Hereinafter, a process performed by the converting part 108 is described. In this process, on the basis of the exterior orientation parameters of the camera at the time the camera takes a target photographed image, position (coordinates) of the designated position in a screen of the target photographed image is calculated.

The following describes a calculation method. First, a photographed image extracted by the extracting part 107 is processed. The exterior orientation parameters of the camera at the time the camera takes this photographed image are calculated when the point cloud data is generated by the point cloud data generating part 102. That is, the exterior orientation parameters are already calculated and are known. In addition, X-Y coordinates at the position of each point of the point cloud data and at the positions of the markers in a screen of the photographed image are also already known. Thus, X-Y coordinates at the position of the designated position in the screen of the photographed image are calculated on the basis of the exterior orientation parameters by setting a directional line connecting the point of view for the photographed image, that is, the camera position, and the designated position, and by obtaining an intersection point of the directional line and the screen of the photographed image.

The judging part 109 judges whether the point with the coordinates designated by the coordinate designating part 106 is in an appropriate range in the photographed image extracted by the extracting part 107.

This judgment is performed for the following reason. In most cases, not all of the contents in the entirety of an aerial photographed image are available as pixel information. For example, the periphery of a photographed image has distortion due to the effect of the distortion of a lens system of a camera or due to other factors and is not appropriate to be used in generation of an orthographic image. In view of this, whether the designated point is in a range of the photographed image that provides information appropriate for generating an orthographic image, is judged by the judging part indicated by the reference sign 109. The judging conditions are set considering the characteristics of the lens system of the camera, the necessary accuracy, and other factors.

The designated-position image-coordinate obtaining part 110 selects a position in the photographed image at the position that is judged as being in the appropriate range by the judging part 109, which is the position designated by the coordinate designating part 106. This data is already calculated by the converting part 108.

The optimum-condition satisfying image selecting part 111 selects a photographed image that satisfies the optimum condition as an image for generating an orthographic image. Details of this process are described later.

The pixel information obtaining part 112 obtains information of a pixel corresponding to a specific position that is designated by the coordinate designating part 106 and that is converted by the converting part 107, from the photographed image satisfying the optimum condition. The pixel information is color information of the pixel. An RGB intensity is used as the color information. The pixel basically has an area of the minimum unit constituting a color image, but an area having some degree of size may be recognized as a pixel region of the minimum unit, and pixel information of this area may be obtained. In this case, an average value of information relating to multiple pixels constituting the pixel region is obtained.

The color information adding part 113 adds the color information of the pixel, which is obtained by the pixel information obtaining part 112, to the DEM generated by the DEM generating part 104. In a case in which there are multiple candidate photographed images, pieces of pixel information of the photographed images are alpha-blended. The alpha blending is a process of determining a definitive color in consideration of overlap of transparent colors in superposing multiple images, as disclosed in Computer Graphics Volume 18, Number 3, July 1984, p. 253 to 259, for example.

In the alpha blending, multiple image parts are composited in accordance with a coefficient, which may be called an "a value". The alpha blending may be used particularly in a case of synthesizing a background image part and a character image part that are drawn separately from each other, to draw an image for an electronic game. In addition, the alpha blending may also be used in antialiasing of a letter image part or other image part. In the synthesizing process, auxiliary data called an "alpha channel" in which information of a pixel to be made transparent is defined is prepared, and a transparent condition of a transparent region in a superposed image is set on the basis of the auxiliary data. Various types of methods and algorithms for performing the alpha blending are publicly known.

The orthographic image generating part 114 generates an orthographic image by using the DEM added with the color information of the pixel. The generation of the orthographic image is performed by a publicly known method. The generation of the orthographic image is disclosed in, for example, Japanese Patents Nos. 4138145, 4237868, and 4313462. Application software for generating an orthographic image is commercially available and may be used.

Example of Processing

Figure 4:
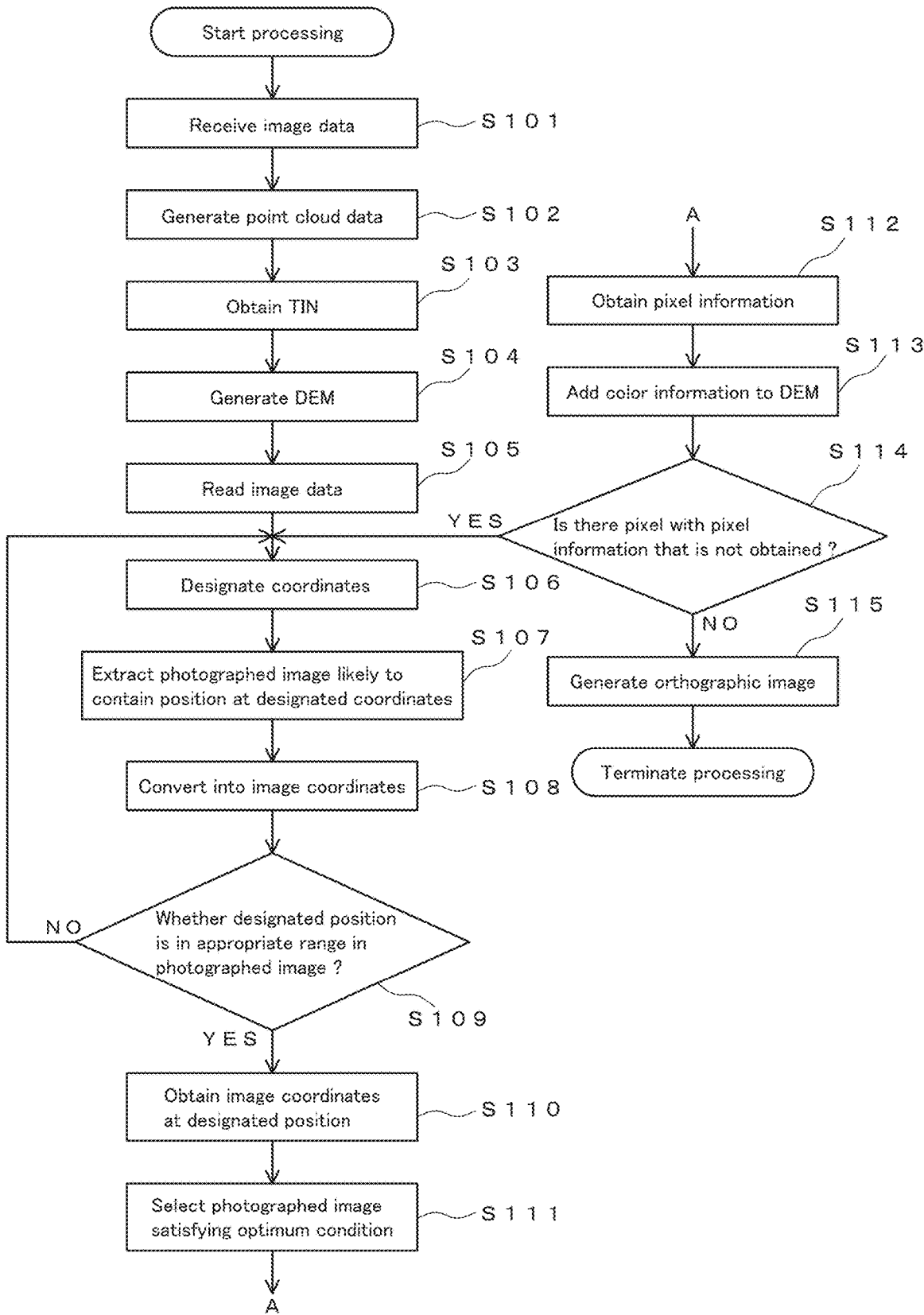
FIG. 4 is a flow chart illustrating an example of a processing procedure.

Hereinafter, an example of operation of the image data processing device 100 is described. FIG. 4 is a flow chart illustrating an example of a processing procedure. The program for executing the processing illustrated in FIG. 4 is stored in an appropriate storage region and is executed by the image data processing device 100. This program can be stored in a server or other unit and can be provided therefrom. Alternatively, this program can be stored in an appropriate storage medium and can be provided therefrom. This is also applied to the case of the processing illustrated in FIG. 5.

After the processing starts, first, data of aerial photographed images taken from a UAV during a flight is received by the image data receiving part 101 (step S101). Herein, data of photographed images of a ground surface of a target region that are consecutively taken at a predetermined time interval from the air during the flight is obtained.

Next, on the basis of the data of the aerial photographed images received in step S101, point cloud data of the target ground surface is generated (step S102). This process is performed by the point cloud data generating part 102. After the point cloud data is obtained, a TIN of an object is generated by using the point cloud data (step S103). This process is performed by the TIN generating part 103. After the TIN is generated, a DEM is generated by using the TIN by the DEM generating part 104 (step S104).

After the DEM is generated, image data to be processed in the subsequent steps, which is the image data obtained in step S101, is read by the photographed image reading part 105 (step S105).

Thereafter, coordinates (ground coordinates) in the DEM generated in step S104 are designated (step S106). Then, a photographed image likely to contain the coordinates designated in step S106 is extracted from among the photographed images read in step S105 (step S107). This process is performed by the extracting part 107.

Next, the coordinates designated in step S106 are converted into coordinates in the photographed image extracted in step S107, that is, coordinates at the X-Y position in the screen of the photographed image (step S108). This process is performed by the converting part 108. In a case in which multiple photographed images are extracted in step S107, the coordinate conversion is performed on each of the photographed images. It is not certain that the extracted photographed image will contain the designated position at this stage. However, herein, the processing of this exemplary operation advances assuming that the extracted photographed image contains the designated position. This assumption also applies to the processes in steps S109, S110, and S111.

For example, seven aerial photographed images contain a point corresponding to the coordinates designated at this stage in the DEM, which are the coordinates designated in step S106. The point is represented as a point Pj, herein. In this case, a process for calculating coordinates in the photographed image (screen) of the point Pj is performed on each of the seven aerial photographed images in step S108.

Thereafter, it is judged (step S109) whether the position of the coordinates designated in step S106, in short, the designated position, is in an appropriate range in the aerial photographed image read in step S105. This process is performed by the judging part 109. For example, in the above specific example, the corresponding position of the point Pj in each of the seven aerial photographed images is investigated, and whether the position in the screen is in a range appropriate to be used in generation of an orthographic image is judged in each of the seven aerial photographed images.

In this condition, if the designated position is judged as being out of the appropriate range in each of the photographed images, the processing returns to step S106, and new coordinates are designated. If the judgement for the designated position is "NO" in some of the photographed images in step S109, the corresponding photographed images are removed at this stage and are not subjected to the processes in step S110 and the subsequent steps. In this case, the photographed image containing the designated position for which the judgment is "YES" is subjected to the processes in step S110 and the subsequent steps.

Then, image coordinates of the designated position for which the judgment is "YES" in step S109 are obtained (step S110). This process is performed by the designated-position image-coordinate obtaining part 110. In this process, information of the designated position for which the judgment is "YES" in step S109, that is, X-Y coordinates in the photographed image of the designated position are obtained.

In one example, a designated position Pj may be selected as the coordinates in the DEM in step S106, and seven photographed images that are likely to contain the designated position Pj may be extracted in step S107. Then, the designated position Pj may be judged as being in an appropriate range in the process in step S109 in six of the seven photographed images. In this example, in step S110, image coordinate values, that is, X-Y coordinate values of the designated position Pj in each of the six photographed images are selected.

Next, among the photographed images from which the image coordinates of the designated position are obtained in step S110, a photographed image satisfying the optimum condition is selected (step S111). This process is performed by the optimum-condition satisfying image selecting part 111.

The photographed image selected at this stage is a photographed image that is expected to contain the designated position and may not contain pixel information of the designated position. This can occur as in the case in FIG. 2 in which the pixel information of a position Pi cannot be obtained from positions of points P4 and P5. In view of this, the process in step S111 is performed to extract a photographed image having the highest possibility of containing pixel information of the target position from among the candidate photographed images at this stage.

Figure 5:
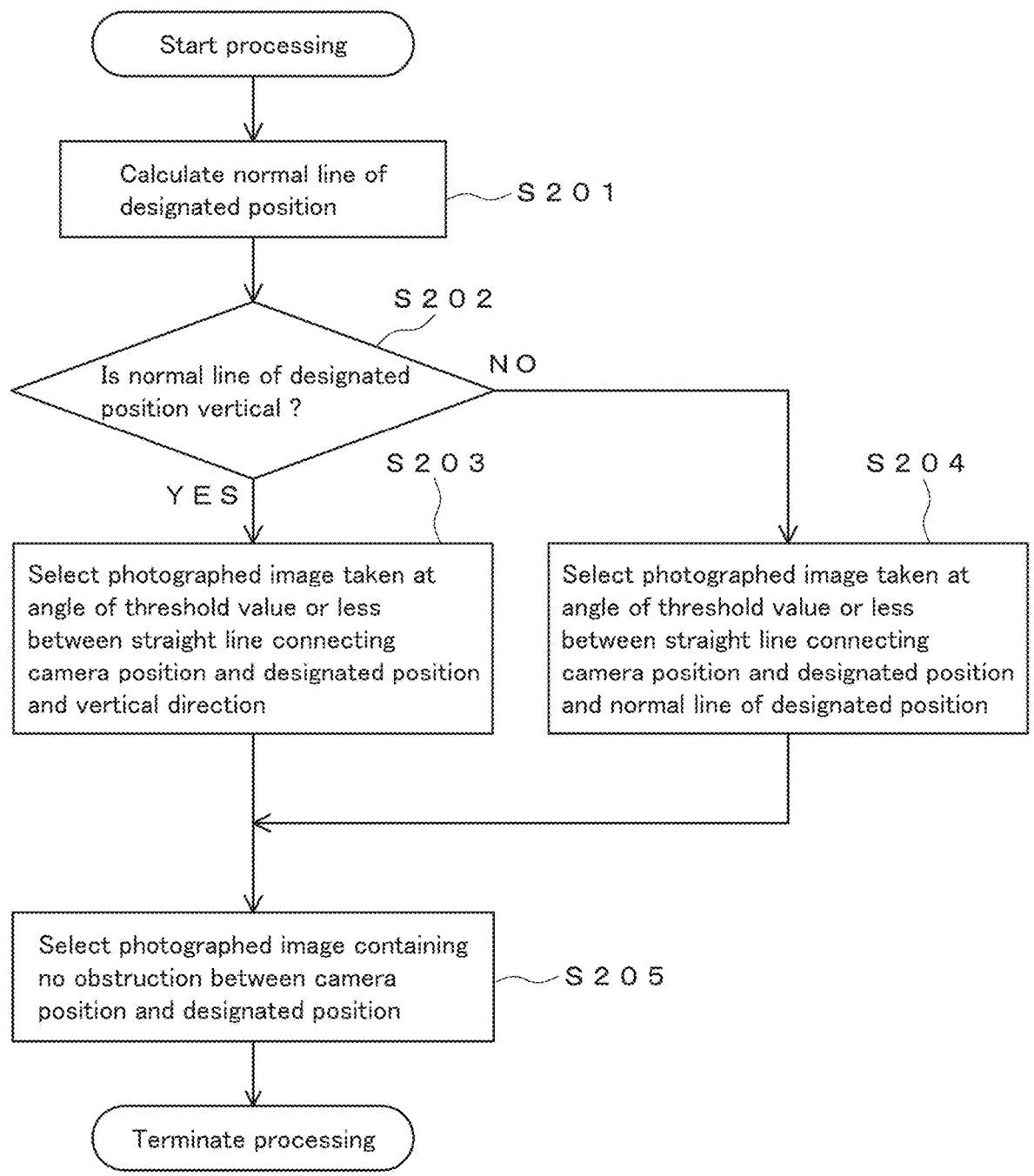
FIG. 5 is a flow chart illustrating an example of a processing procedure.

The following describes details of the process in step S111. In this process, a photographed image taken downwardly from a vertical direction is preferentially selected when the designated position is in a horizontal surface, or a photographed image taken from a direction perpendicular to a slope surface is preferentially selected when the designated position is in the slope surface. FIG. 5 illustrates an example of the process in step S111.

In this process, first, a normal line of the designated position, which is a coordinate position designated by the coordinate designating part 106, is calculated (step S201). Specifically, first, a point cloud in a region corresponding to a size with an area such as of 5×5 pixels or 9×9 pixels and with the designated position at the center, is selected. Thereafter, the point cloud existing in the selected region is extracted from among the point cloud data generated in step S102, and an equation of a plane that fits to the extracted point cloud is derived, and a normal line of this plane is calculated.

Then, the judgement in step S202 is performed. In the judgement, first, an angle between an extended direction of the normal line of the designated position and a vertical direction is calculated. The normal line of the designated position is calculated in step S201. Then, whether the angle is a predetermined threshold or less, or is not, is judged. For example, the threshold is 10 degrees. When the judgement is "YES", the normal line is recognized as being in the vertical direction or can be assumed as being in the vertical direction, the processing advances to step S203. Otherwise, the processing advances to step S204. A small threshold allows preferential selection of a front view image and thereby increases the accuracy in orthographic projection conversion, but decreases the number of available images and causes decrease in the accuracy in the pixel information. In contrast, a large threshold tends to have effects opposite to the above effects. Normally, the threshold is selected in a range of 5 to 20 degrees.

For example, in a case in which a UAV flies at a slow speed, and the photographing interval is short, the number of photographed images containing the same objects increases. Thus, even when the threshold is small, the adverse effects are small, and therefore, a high quality orthographic image is obtained. In contrast, in a case in which the number of the aerial photographed images that contain the same objects is small due to some conditions, when the threshold is small, the number of the available images is decreased, and therefore, the adverse effects are apparent. From this point of view, the threshold is set in consideration of the balance of the flight speed of the UAV, the photographing interval, and the necessary quality of the orthographic image.

In step S203, a photographed image taken at an angle of a threshold or less is selected. The angle is between a straight line and a vertical line. The straight line connects the camera position, the position of the point of view, or the photographing position, at the time the camera takes the target photographed image, and the designated position. The threshold is, for example, 10 degrees. This value for the threshold is an example and may be another value in consideration of various factors.

In step S204, a photographed image taken from a direction of the normal line, which is calculated in step S201, of the designated position focused at this stage.

Specifically, a photographed image taken at an angle of a threshold or less is selected. The angle is between a straight line and the normal line of the designated position. The straight line connects the camera position or the position of the point of view at the time the camera takes the target photographed image, and the designated position. The threshold of the angle is, for example, 10 degrees. Of course, this value is an example and may be another value in consideration of various factors.

After step S203 or S204, among the photographed images selected in step S203 or S204, an image containing no obstruction between the position of the camera taking the photographed image and the designated position is selected (step S205).

In the process in step S205, first, a straight line connecting the camera position and the designated position is set in the target photographed image. Then, whether a point of which the shortest distance to the straight line is a predetermined threshold or less, or is not, is contained in the point cloud data generated in step S102 is examined. The threshold is, for example, a value in a range of approximately 5 cm to 2 m.

When there is a corresponding point, the target photographed image is not selected. Otherwise, when there is no corresponding point, the target photographed image is selected as an "image containing no obstruction between the camera position and the designated position". The process in step S205 eliminates the photographed image containing the designated position that is occluded. These processes in FIG. 5 are performed in step S111 in FIG. 4.

Figure 2:
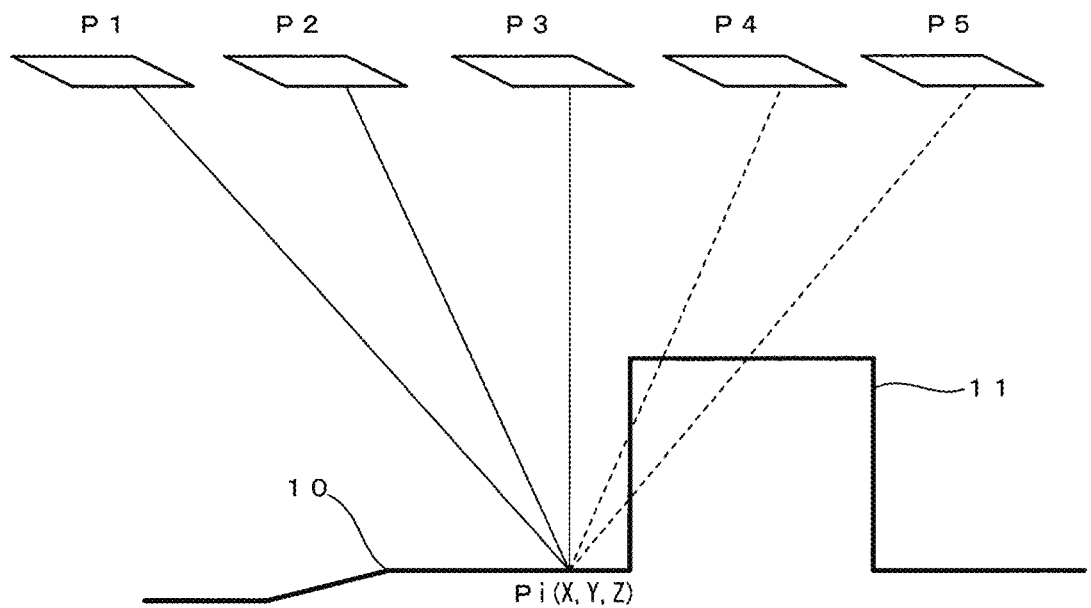
FIG. 2 is an explanatory diagram illustrating a principle of an embodiment.

For example, in a case in which the position Pi in FIG. 2 is the designated position, the judgment in step S202 is "YES", and a position P3 is selected in step S203. Depending on the threshold condition, a photographed image at the photographing position of a position P2 or P4 may be selected. However, the photographed image at the photographing position of the position P4 is eliminated in step S205.

Figure 3:
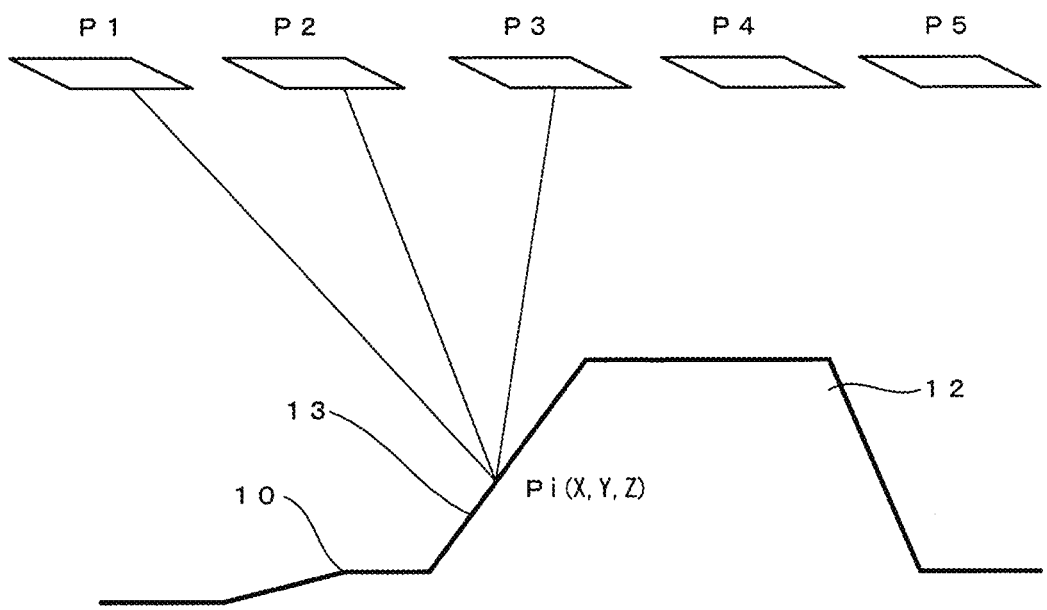
FIG. 3 is an explanatory diagram illustrating a principle of an embodiment.

In another case in which the designated position is the position Pi in FIG. 3, the judgement in step S202 is "NO", and the processing advances to step S204, and a position P1 is selected in step S204. At this time, if the condition of the threshold is lowered, a position P2 may be selected.

In the process in step S205, the following process may also be performed. In the following process, the point cloud data generated in step S102 is used to judge the existence of an object shading the designate position, for example, a building 11 in FIG. 2. In obtaining point cloud data from an image, there may be cases of obtaining an incorrect point cloud that does not actually exist and works as noise. The incorrect point cloud can cause an image to be not selected even though the image originally contains a designated position. The following describes a technique for avoiding this problem.

First, it is assumed that a point that is judged as being an obstruction in the process in step S205 is detected. At this time, the point may satisfy at least one of the following conditions: "the point is isolated from the surroundings", "the point is not extracted from photographed images that are taken in a consecutive manner", and "the number of the points is threshold or less". In this case, the point is judged as a noise in the operation and being in an incorrect point cloud that does not obstructs and that does not constitute an obstruction.

Returning to FIG. 4, after step S111, pixel information, which is color information, of the designated position in the photographed image selected in step S111 is obtained (step S112). This process is performed by the pixel information obtaining part 112. In a case in which a corresponding photographed image cannot be selected in step S111, the part relating to the coordinates is colored in black and is processed as an omitted part of the pixel information. At this time, the processing may return to the step prior to step S106, the threshold condition may be relaxed, and the process for obtaining a photographed image to be selected in step S111 may be performed again.

Next, the pixel information, which is the color information of the pixel, obtained in step S112, is added to the DEM generated in step S104 (step S113). This process is performed by the color information adding part 113.

Thereafter, whether there is a pixel with pixel information that is still not obtained, is judged (step S114). If there is a pixel with pixel information that is still not obtained, the processing returns to the step prior to step S106, and the process for obtaining new pixel information at another position is performed. If there is no pixel with pixel information that is not obtained, an orthographic image is generated in accordance with the DEM added with the pixel information (color information) (step S115), and the processing is terminated. The generation of the orthographic image is performed by the orthographic image generating part 114.

Advantages

The processes in steps S202 and S203 allow selection of a photographed image taken from a direction perpendicular to the target position as much as possible and enable obtaining the pixel information of the target position. Thus, pixel information with higher accuracy is obtained. In particular, in a case in which the target is the slope surface 13 (refer to FIG. 3) at a raised part 12 of the surface ground, the processes of step S201, S203, and S204 performed in this order allow selection of a photographed image that is taken from a direction perpendicular to the slope surface 13. Thus, the pixel information of the slope surface 13 is obtained at higher accuracy. For example, in surveying relating to construction of a slope in civil engineering works, obtaining correct image information of the slope is important. That is, it is essential to obtain an image of a slope surface of the slope as viewed from the most perpendicular possible direction (front direction).

In generating an orthographic image from aerial photographed images, color information of a pixel is obtained from multiple aerial photographed images to increase the accuracy of the color information and to increase the resolution. The aerial photographed images may include an aerial photographed image from which desired pixel information cannot be obtained due to occlusion. For example, aerial photographed images taken at the photographing positions P4 and P5 in FIG. 2 do not contain the pixel information of the position Pi because the position Pi is occluded by the building 11.

According to the processing using the image data processing device 100, photographed images taken from the positions P4 and P5 are not selected from candidate photographed images, but a photographed image that reliably contains a target position is selected. This process is performed in step S205. This process decreases noise, which is unnecessary color information, in alpha blending of pieces of pixel information obtained from the multiple photographed images, thereby improving the accuracy and resolution of an orthographic image that is finally obtained.

FIG. 6A is a view of an orthographic image obtained in the case of not performing the process in step S111 of the processing in FIG. 4. FIG. 6B is a view of an orthographic image obtained in the case of performing the processes in step S111 in FIG. 5.

The orthographic image in FIG. 6A contains a power shovel at an upper right side in a condition in which an arm of the power shovel is not correctly shown and is blurred and doubled. This occurs because the pixel information from an oblique direction is alpha-blended in the process in step S113, and thus, pixel information of an arm side surface that is unnecessary in the orthographic image is mixed.

On the other hand, the orthographic image in FIG. 6B contains an image of the arm of the power shovel in a clear condition. This is because information of the arm side surface, which is an image viewed from an oblique direction and is not necessary in the orthographic image, is reduced by selecting only a photographed image containing the arm viewed from the vertical direction or approximately vertical direction, in the image selection for obtaining the pixel information in the proximity to the arm (step S202).

FIGS. 6A and 6B contain a building at a lower right side. FIG. 6A illustrates the building with unclear edges, and thus, noise components are visually recognized. In contrast, FIG. 6B illustrates the building with edges that are clearly visually recognized. This also occurs because FIG. 6A contains information of a wall side surface and a roof surface of the building, which is essentially unnecessary in the orthographic image.

Moreover, FIGS. 6A and 6B contain parking spaces next to the building. FIG. 6A shows the parking spaces with some abutting the building, which is unclear because the image information of the roof and the wall of the building is mixed together. In contrast, the corresponding part in FIG. 6B is clearly visually recognized as parking spaces. This occurs because FIG. 6A contains the information of the roof of the building, which is essentially unnecessary in the orthographic image. This can be understood that a phenomenon similar to that occurring in the case in FIG. 2 also occurs in FIG. 6A. In the case in FIG. 2, the pixel information of the roof of the building 11 is obtained from a photographed image taken at the photographing position P4 as the image information in the position Pi direction and is alpha-blended in the pixel information of the position Pi obtained from the photographed images taken at the photographing positions P2 and P3.

On the other hand, in FIG. 6B, mixing of the information of the roof and the wall side surface of the building is avoided by selecting an image viewed downwardly from the vertical direction or approximately vertical direction and by not selecting a photographed image taken from positions corresponding to the positions P4 and P5 in FIG. 2, whereby unclear images of the parking spaces are not shown, unlike the case in FIG. 6A.

FIGS. 6A and 6B also contain several human figures. Regarding the human figures, the images of the human figures are unclear in FIG. 6A, whereas they are clear in FIG. 6B. That is, FIG. 6B illustrates correct images of the head and the shoulders of standing humans as viewed downwardly from the vertical direction. On the other hand, it is difficult to say that the parts illustrated in FIG. 6A corresponding to these images are images that can be recognized as humans. Note that the number and the locations of the human figures differ between FIGS. 6A and 6B because the used aerial photographed images were taken at different photographing times.

Compared with the vehicle images of FIG. 6A, the vehicle images of FIG. 6B are sharp and clear, which indicates less unnecessary noise components. This is the result of eliminating noise components in accordance with the processes in steps S202 and S203 in FIG. 5, in which a photographed image containing less distortion is obtained by selecting a photographed image containing a target surface viewed from a direction as close to the front as possible, and in which a photographed image containing occlusion at the target position is not used in the alpha-blending as a result of the process in step S205.

Other Matters

In one embodiment, a photographed image taken at an angle of a predetermined threshold or less between an optical axis of a camera that takes the photographed image and the vertical line, may be selected. The threshold is, for example, 10 degrees. There may be cases in which the attitude of a flying UAV is not stable, and thus, the attitude of the camera is changed from the vertical downward direction that is an initial set condition. In such cases, the above processing allows preferential selection of a photographed image containing a designated position that is viewed downwardly from the vertical direction.

Since each of the photographed images is associated with data of the attitude of the UAV at the time of photographing, the above processing can be performed on the basis of the attitude of the UAV.

The following processes may be performed instead of the processes in steps S201 to S204, and then the process in step S205 may be performed. In the alternative processes, a photographed image is selected by using an angle direction in the middle between the normal line of the designated position and the vertical direction as reference.

Specifically, assuming that the designated position is represented as Pi, an elevation angle in a direction perpendicular to the designated position Pi, which is an angle from a horizontal surface, is represented as $\theta 1$, and an elevation angle in the vertical direction $\theta 2$ is 90 degrees, a directional line 1 extending in the direction "$(\theta 1+\theta 2)/2$" as viewed from the designated position Pi is calculated. Moreover, a directional line 2 connecting the designated position Pi and the camera position is calculated. Thereafter, an angle between the directional lines 1 and 2 is calculated, and a photographed image taken at an angle of a threshold or less is selected. For example, the threshold is 10 degrees. These processes allow preferential selection of a photographed image containing a slope surface taken downwardly from an angle as close to the vertical direction as possible even when the designated position Pi is at the slope surface. Also, in a case in which the normal line of the designated position Pi is close to the vertical direction, a photographed image taken downwardly from a direction close to the vertical direction is selected.

For example, the tilt of the slope surface 13 in FIG. 3 may be steep, and an angle between the normal line of the slope surface 13 and the vertical direction may be 45 degrees or higher. In this case, in accordance with the process in step S203, a photographed image taken from a lower angle as viewed from the designated position Pi, that is, an elevation angle of 45 degrees or less, may be selected as a selection candidate, and an appropriate image may not be selected.

However, in accordance with the above method, a photographed image taken from a direction as close to the vertical direction as possible is selected even when the tilt of the slope surface 13 is steep. For example, it is assumed that the elevation angle $\theta 1$ of the normal line of the designated position Pi as viewed from the designated position Pi in FIG. 3 is 40 degrees. In this case, the elevation angle $\theta 2$ in the vertical direction as viewed from the designated position Pi is 90 degrees, and thus, a photographed image taken from a direction in which the elevation angle as viewed from the designated position Pi is (θ1+θ2)/2=65 degrees, is selected. As a result, a photographed image containing the slope surface 13 taken downwardly from an angle close to the vertical direction is selected.

The angle direction in the middle between the elevation angles θ1 and θ2 is not limited to the center. That is, the above example is a case in which n=2 for the formula: (θ1+θ2)/n, which determines the direction of the camera position as viewed from the designated position, for example, the designated position Pi in FIGS. 2 and 3. However, the value of "n" can be selected in a range of approximately 1.5 to 4. For example, in a case in which the elevation angle of the normal line of the designated position is small, that is, the angle from the vertical direction is large, the value "n" is set small. This enables balancing the requirement for an image of being taken from the front direction relative to the slope surface and the requirement for an image of being taken downwardly from the vertical direction. Note that the value "n" is selected so that the value "(θ1+θ2)/n" is less than 90 degrees.

What is claimed is:

1. An image processing device for generating an orthographic image on the basis of multiple aerial photographed images that are obtained by photographing an object from multiple different positions by a camera arranged on an aerial vehicle, the image processing device comprising a processor or circuitry configured to:

receive image data of the multiple aerial photographed images;

generate point cloud data of the object on the basis of the received image data;

generate a triangulated irregular network (TIN) on the basis of the point cloud data;

generate a digital elevation model (DEM) on the basis of the TIN;

receive designation of a specific position of the object;

extract multiple aerial photographed images that are likely to contain the designated specific position, from among the multiple aerial photographed images;

select an image satisfying optimum condition, from among the extracted multiple aerial photographed images;

blend color information of pixels of the selected image and add the color information to the DEM; and generate an orthographic image on the basis of the DEM in which the color information is added, wherein, in a condition in which n=1.5 to 4, the designated specific position is represented as Pi, an elevation angle in a direction perpendicular to the position Pi is represented as θ1, an elevation angle in a vertical direction is 90 degrees, a directional line 1 that extends in an elevation angle represented as (θ1+90°)/n as viewed from the position Pi is calculated, a directional line 2 that connects the position Pi and the position of the camera at the time of photographing is calculated, an angle formed between the directional line 1 and the directional line 2 is calculated, and an image in which the angle formed between the directional line 1 and the directional line 2 is a threshold or less is selected.

2. An image processing method for generating an orthographic image on the basis of multiple aerial photographed images that are obtained by photographing an object from multiple different positions by a camera arranged on an aerial vehicle, the image processing method comprising:

receiving image data of the multiple aerial photographed images;

generating point cloud data of the object on the basis of the received image data;

generating a triangulated irregular network (TIN) on the basis of the point cloud data;

generating a digital elevation model (DEM) on the basis of the TIN;

receiving designation of a specific position of the object;

extracting multiple aerial photographed images that are likely to contain the designated specific position, from among the multiple aerial photographed images;

selecting an image satisfying optimum condition, from among the extracted multiple aerial photographed images;

blending color information of pixels of the selected image and adding the color information to the DEM; and generating an orthographic image on the basis of the DEM in which the color information is added, wherein, in a condition in which n=1.5 to 4, the designated specific position is represented as Pi, an elevation angle in a direction perpendicular to the position Pi is represented as θ1, an elevation angle in a vertical direction is 90 degrees, a directional line 1 that extends in an elevation angle represented as (θ1+90°)/n as viewed from the position Pi is calculated, a directional line 2 that connects the position Pi and the position of the camera at the time of photographing is calculated, an angle formed between the directional line 1 and the directional line 2 is calculated, and an image in which the angle formed between the directional line 1 and the directional line 2 is a threshold or less is selected.

3. A non-transitory computer recording medium storing computer executable instructions for generating an orthographic image on the basis of multiple aerial photographed images that are obtained by photographing an object from multiple different positions by a camera arranged on an aerial vehicle, the computer executable instructions, that, when executed by a computer processor, cause the computer processor to:

receive image data of the multiple aerial photographed images;

generate point cloud data of the object on the basis of the received image data;

generate a triangulated irregular network (TIN) on the basis of the point cloud data;

generate a digital elevation model (DEM) on the basis of the TIN;

receive designation of a specific position of the object;

extract multiple aerial photographed images that are likely to contain the designated specific position, from among the multiple aerial photographed images;

select an image satisfying optimum condition, from among the extracted multiple aerial photographed images;

blend color information of pixels of the selected image and add the color information to the DEM; and generate an orthographic image on the basis of the DEM in which the color information is added, wherein, in a condition in which n=1.5 to 4, the designated specific position is represented as Pi, an elevation angle in a direction perpendicular to the position Pi is represented as θ1, an elevation angle in a vertical direction is 90 degrees, a directional line 1 that extends in an elevation angle represented as (θ1+90°)/n as viewed from the position Pi is calculated, a directional line 2 that connects the position Pi and the position of the camera at the time of photographing is calculated, an angle formed between the directional line 1 and the directional line 2 is calculated, and an image in which the angle formed between the directional line 1 and the directional line 2 is a threshold or less is selected.

* * * * *